May 12, 1925.
H. W. BUNDY
METHOD OF MAKING DOUBLE TUBES
Filed Jan. 9, 1924
1,537,405
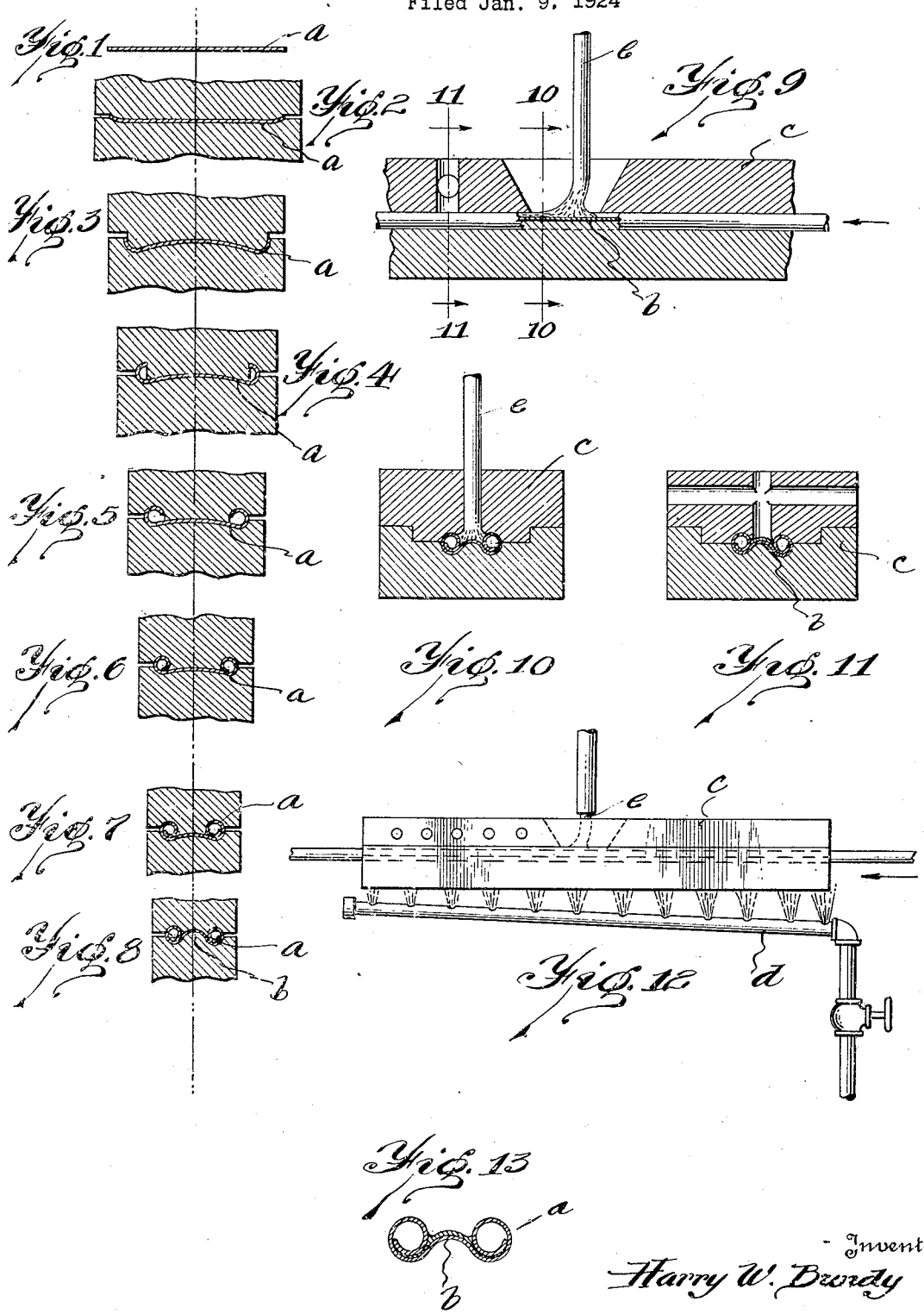
Inventor
Harry W. Bundy
By Stuart C. Barnes
Attorney Patented May 12, 1925.

1,537,405

UNITED STATES PATENT OFFICE.

HARRY W. BUNDY, OF DETROIT, MICHIGAN.

METHOD OF MAKING DOUBLE TUBES.

Application filed January 9, 1924. Serial No. 685,146.

*To all whom it may concern:*

Be it known that I, HARRY W. BUNDY, a citizen of the United States, residing at Detroit, in the county of Wayne and State of Michigan, have invented certain new and useful Improvements in Methods of Making Double Tubes, of which the following is a specification.

This invention relates to double tubes constructed of a single piece of metal, longitudinally traveling and progressively fashioned and soldered to first form and then secure the tubes together.

More specifically the product is designed for connecting electric conductors but obviously the product herein to be claimed may have a wider field of usefulness than the connectors referred to. The invention relates to both the product and the method of making the same.

A good many electric conductors such as telephone and telegraph wires are now connected together by inserting the conductors in a pair of connected together tubes and then twisting or distorting the connector and the wires to fashion them together. This is found to make a better and more mechanical joint than the old method of simply twisting the wires together.

These connectors have ordinarily in the past been made out of seamless tube. A seamless tube of relatively large diameter has been either drawn down or pressed down into two small tubes at each side connected by a pair of webs. The object of my invention is to make a product of this kind out of a single piece of strip metal. This will make the product very much cheaper as seamless tube is relatively expensive. It is a well known fact that seamless tube has to be made first by splitting a hot billet and then drawing down the seamless tube by often a great many passes to get it to the proper size and connection. This makes seamless tube impossible to compete with ordinary tube made of strip metal which requires only one pass through the machine.

In the drawings:

Figs. 1 to 8 inclusive show the passage of the strip through the rolls for rolling the same to shape, Fig. 9 is an enlarged longitudinal section of the sweating die or soldering apparatus, Fig. 10 is a section on the line 10—10 of Fig. 9, Fig. 11 is a section on the line 11—11 of Fig. 9, Fig. 12 is an elevational view of the sweating die or soldering apparatus, and Fig. 13 is an enlarged secton of the completed product.

A strip of sheet metal, preferably copper, is passed through the various rolls shown in Figs. 2 to 8, inclusive. The strip is designated $a$. These rolls might be replaced by dies or some of the rolls might be replaced by dies. This is a mere manufacturing choice and within the skill of any designer of rolls and dies for fashioning metal shapes. The rolls that I have shown, gradually and progressively turn up and fashion the edges of the tube into a pair of tubes or beads. These tubes or beads have the turned-over portion turned in relatively deep for the purpose of forming a fairly good overlap on which to rest the cementing medium. Preferably, the connecting web $b$ is formed up into a longitudinally running corrugation.

The fashioned strip is then passed through a soldering apparatus which is specifically a sweating die $c$ which is subjected to any suitable source of heat such as the gas burner $d$. This sweating die serves to heat the tube to a relatively high heat and melts the solder strip $e$, which is fed into the top of the die. The melted solder strikes the longitudinal rib formed by the corrugation and flows down through the overlapped seam, consequently, when the product issues from the said die and cools, the solder hardens and serves to cement the curled over edges of the strip to the body of the strip to form the two separated tubes.

Inasmuch as this application is directed to the method, I have only shown the apparatus that may be used in a more or less sketchy way for, the steps of the method being amply described, it will be obvious to those skilled in the art how to provide suitable apparatus to practice the method on a commercial production basis. For instance, I have not shown the solder die coupled up with the shaping members; obviously, this could be done or need not be done, depending upon the choice of the manufacturer. Furthermore, it is of course, desirable to give the tube a bath in fluxing acid, or several baths. This might be done by immersing the same by hand or it may be done by suitable instrumentalities interposed in the progressive path of the tube or strip as it travels along.

What I claim is:

1. The method of making a pair of small tubes with an intervening connecting web, which comprises causing the strip to travel longitudinally and fashioning the edges over into small tubes with overlapped joints with the body of the tube to form a pair of small tubes connected by an intervening web, and then flowing a stream of solder onto the web between the tubes to solder the lapped joints.

2. The method of making a pair of small tubes with an intervening connecting web, which comprises causing the strip of metal to travel longitudinally and while traveling turning over the edges into lapped joint tubes and cementing the turned over edges to the body of the strip to form a pair of small tubes connected together.

3. The method of making a pair of small tubes with an intervening connecting web, which comprises the causing of a strip of sheet metal to move longitudinally and while so moving turning over the edges to form a pair of small tubes, and forcing up the intervening web into a longitudinally running corrugation, the turned over edges being caused to overlap with the said web and the body of the strip and then, while so traveling, the soldering of such overlapped portions.

4. The method of making a pair of small tubes with an intervening connecting web, which comprises the moving of a strip of metal longitudinally, and while so moving applying forces to the edge of the strip to roll the same over into tubular members having joints with the body of the strip, and while so moving longitudinally flowing the melted solder on to the web and directing the same down into the joints of the tubular members for the purpose of completing the tubes at each edge with the intervening web.

In testimony whereof I affix my signature.

HARRY W. BUNDY.